(12) United States Patent
Lipka et al.

(10) Patent No.: US 9,413,025 B2
(45) Date of Patent: Aug. 9, 2016

(54) HYBRID FLOW BATTERY AND MN/MN ELECTROLYTE SYSTEM

(75) Inventors: Stephen M. Lipka, Richmond, KY (US); Christopher R. Swartz, Lexington, KY (US)

(73) Assignee: THE UNIVERSITY OF KENTUCKY RESEARCH FOUNDATION, Lexington, KY (US)

(*) Notice: Subject to any disclaimer, the term of this patent is extended or adjusted under 35 U.S.C. 154(b) by 296 days.

(21) Appl. No.: 14/118,664

(22) PCT Filed: May 23, 2012

(86) PCT No.: PCT/US2012/039144
§ 371 (c)(1),
(2), (4) Date: Nov. 19, 2013

(87) PCT Pub. No.: WO2012/162393
PCT Pub. Date: Nov. 29, 2012

(65) Prior Publication Data
US 2015/0111117 A1    Apr. 23, 2015

Related U.S. Application Data

(60) Provisional application No. 61/489,072, filed on May 23, 2011.

(51) Int. Cl.
*H01M 8/18* (2006.01)
*H01M 8/20* (2006.01)

(52) U.S. Cl.
CPC ............... *H01M 8/188* (2013.01); *H01M 8/20* (2013.01); *H01M 2300/0011* (2013.01); *Y02E 60/528* (2013.01)

(58) Field of Classification Search
CPC .......... H01M 8/18; H01M 8/188; H01M 8/20

USPC ................................. 429/500, 504
See application file for complete search history.

(56) References Cited

U.S. PATENT DOCUMENTS

| | | | |
|---|---|---|---|
| 6,986,966 | B2 | 1/2006 | Clarke et al. |
| 7,258,947 | B2 | 8/2007 | Kubata et al. |
| 7,537,859 | B2 | 5/2009 | Samuel et al. |
| 7,820,321 | B2 | 10/2010 | Horne et al. |
| 2012/0045680 | A1 | 2/2012 | Dong et al. |
| 2012/0052347 | A1 | 3/2012 | Wilson et al. |
| 2012/0077068 | A1 | 3/2012 | Wang et al. |
| 2012/0077079 | A1 | 3/2012 | Li et al. |
| 2012/0107661 | A1 | 5/2012 | Lee et al. |

FOREIGN PATENT DOCUMENTS

| | | | |
|---|---|---|---|
| DE | 102006007206 A1 | 10/2006 | |
| JP | 2010092635 A | 4/2010 | |
| WO | WO 2012161917 A1 * | 11/2012 | ............ H01M 8/188 |

OTHER PUBLICATIONS

Arora, et al.; "Battery Separators"; Chemical Reviews, 2004, vol. 104, No. 10, pp. 4419-4462; American Chemical Society 2004.
Hruska et al.; "Investigation of Factors Affecting Performance of the Iron-Redox Battery"; Electrochemical Science and Technology, Jan. 1981, vol. 128, No. 1, pp. 18-25.
International Search report and Written Opinion of International application No. PCT/US2012/039144 dated Aug. 9, 2012.

* cited by examiner

*Primary Examiner* — Karie O'Neill Apicella
(74) *Attorney, Agent, or Firm* — King & Schickli, PLLC

(57) ABSTRACT

An electrolyte system for a hybrid flow battery has a manganese based anolyte and a manganese based catholyte.

16 Claims, 6 Drawing Sheets

HYBRID FLOW BATTERY AND MN/MN ELECTROLYTE SYSTEM

This application is the national stage of international patent application no. PCT/US2012/039144 filed on May 23, 2012, which in turn claims priority from U.S. Provisional Patent Application Ser. No. 61/489,072 filed on May 23, 2011, the full disclosure of which is incorporated herein by reference.

GOVERNMENT LICENSE RIGHTS

This invention was made with government support under Phase I Small Business Innovation Grant awarded by the Department of Energy under contract no. DE-FG02-09ER85267. The government has certain rights in the invention.

BACKGROUND

The present invention relates to flow batteries and particularly to hybrid redox flow batteries. Flow batteries are electrochemical devices in which the chemical energy stored in electro-active materials is converted to electrical energy. The electro-active materials include those for the negative electrode reaction and those for the positive electrode reaction. In flow batteries, the electro-active materials are typically stored externally to the power-conversion device and are introduced into the power-conversion device when the device is operated.

Unlike traditional batteries, where active materials, electrolyte, and separator are stored within the casing of the electrochemical cell, redox flow batteries feature electrolytes which are stored in external tanks, and are pumped into the cell during each charge/discharge cycle. One feature of redox flow batteries is that the energy is stored in the soluble oxidized/reduced species which exist in the electrolyte, unlike traditional batteries, where energy is stored in the bulk electrode materials, and which are thus subjected to mechanical and thermal stresses during cycling, thereby contributing to reduced battery cycle life.

Some advantages of redox flow batteries may include: rapid response times, moderate cost, modularity, transportability, low maintenance, and flexible operation. Redox flow batteries may also be capable of extended cycle life, as systems with greater than 10,000 charge/discharge cycles have been reported. Hybrid flow batteries have an additional advantage over standard flow battery designs in that no ion-exchange membrane is required. Such membranes are very expensive. They also often require repair or maintenance which takes the battery offline. Thus, hybrid flow batteries without such ion-exchange membranes allow for cost savings and reduced down time for maintenance.

SUMMARY

In accordance with the purposes and advantages disclosed herein, an electrolyte system is provided for a hybrid flow battery. That electrolyte system may be broadly described as comprising an anolyte including $Mn^{2+}$ and $Mn^{3+}$ and a catholyte including $Mn^{2+}$ and $Mn^0$. The electrolyte system may also include a first supporting electrolyte. That first supporting electrolyte is selected from a group consisting of $(NH_4)_2SO_4$, $NH_4HSO_4$ and mixtures thereof. The electrolyte system may also include a second supporting electrolyte wherein the second supporting electrolyte is $H_2SO_4$. The anolyte has a concentration of between about 1M and about 2M and the electrolyte system has a pH of about 2 to about 6.

In one useful embodiment the electrolyte system includes about 1M to about 2M $(NH_4)_2SO_4$ in about 1M $H_2SO_4$. Further the electrolyte includes about 1.18M manganese salt and about 1.13M diammonium salt.

A hybrid redox flow battery with an anolyte including $Mn^{2+}$ and $Mn^{3+}$ and a catholyte including $Mn^{2+}$ and $Mn^0$ is provided. That battery includes a plurality of cells. Further, in some embodiments the battery does not include an ion-exchange membrane.

BRIEF DESCRIPTION OF THE DRAWING FIGURES

The accompanying drawing figures incorporated in and forming a part of the specification, illustrate several aspects of the present electrolyte system and hybrid redox flow battery and together with the description serve to explain certain principles thereof. In the drawing figures.

Reference will now be made in detail to the present embodiments, examples of which are illustrated in the accompanying drawing figures.

DETAILED DESCRIPTION

Embodiments disclosed herein provide hybrid redox flow battery devices and related methods wherein both the anolyte and the catholyte include a manganese redox couple. Embodiments of individual hybrid redox flow cells and redox flow cells connected in series using bipolar plates are disclosed. The hybrid redox flow cells can include electrodes including carbon nanospheres prepared from renewable sources. Also provided are electrical energy storage systems comprising hybrid redox flow battery devices.

Hybrid Redox Flow Batteries

Figure 3:
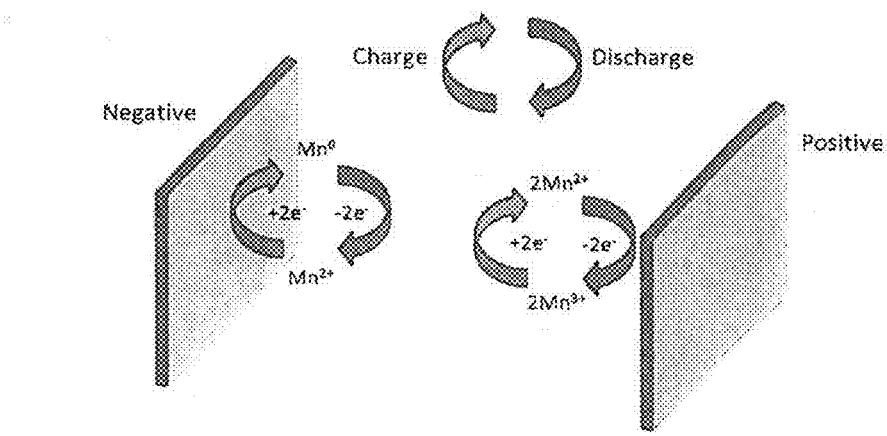
FIG. 3 shows a schematic representation of a Mn/Mn hybrid redox flow battery.

FIG. 3 illustrates a redox flow battery system based on aqueous Mn/Mn electrochemistry. A hybrid redox flow battery including a manganese redox couple at both positive and negative electrodes is provided. The hybrid redox flow battery can include an anolyte and a catholyte, where the anolyte includes a first manganese redox couple and the catholyte includes a second manganese redox couple.

Reversible charge/discharge reactions for one embodiment of a $Mn^{2+}/Mn^{3+}$ positive electrode are shown in Equations 1 and 2:

$$2Mn^{2+} - 2e^- \rightarrow 2Mn^{3+} \quad E^0 = +1.27V \text{ vs. SCE} \qquad \text{(Eq. 1; charge)}$$

$$2Mn^{3+} + 2e^- \rightarrow 2Mn^{2+} \qquad \text{(Eq. 2; discharge)}$$

In some embodiments, the first manganese redox couple can include a $Mn^{2+}/Mn^{3+}$ redox couple. The anolyte may be prepared by addition of stoichiometric amounts of manganese salts, including manganese sulfate monohydrate, and manganese acetate, to deionized water, with stirring, followed by addition of appropriate amounts of concentrated sulfuric acid to the solution to produce electrolyte compositions with the desired molarities of both manganese salt and sulfuric acid supporting electrolyte. For example, to prepare a 1M MnSO$_4$*H$_2$O solution in 5M H$_2$SO$_4$, 55 mL of concentrated sulfuric acid were added slowly, with stirring, to 200 mL of deionized water, followed by the addition of 43.1001 grams of MnSO$_4$*H$_2$O. In some embodiments, the anolyte may include about 1M to about 2M manganese ion. In some embodiments, the anolyte may have a pH of about 2 to about 6.

Reversible charge/discharge reactions for one embodiment of a Mn$^{2+}$/Mn$^0$ negative electrode are shown in Equations 3 and 4:

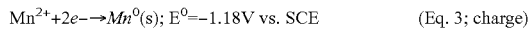

Mn$^{2+}$+2e−→$Mn^0$(s); E$^0$=−1.18V vs. SCE    (Eq. 3; charge)

Mn$^0$(s)→Mn$^{2+}$+2e$^−$    (Eq. 4; discharge)

In some embodiments, the second manganese redox couple can include a Mn$^{2+}$ Mn$^0$ redox couple. In some embodiments, a manganese plating bath can serve as both anolyte and catholyte. The manganese plating bath may be prepared by the addition, with stirring at 25° C., of 28.5075 grams of (NH$_4$)$_2$SO$_4$ to 190 mL of 1M H$_2$SO$_4$, followed by the addition of 37.99 grams of MnSO$_4$*H$_2$O to the mixture. The solution concentration of the manganese salt is 1.183M, and the diammonium salt concentration is 1.135M. (See Wei, P. et al. *Surface and Coatings Technology.* 2007, 201, 7739.) In some embodiments, the catholyte may include about 1M to about 2M manganese ion. In some embodiments, the catholyte may have a pH of about 2 to about 6. In some embodiments, the catholyte may include a supporting electrolyte, such as, for example, (NH$_4$)$_2$SO$_4$ or ammonium bisulfate ("NH$_4$HSO$_4$"). In some embodiments, the catholyte may include about 1M to about 2M (NH$_4$)$_2$SO$_4$ in 1M H$_2$SO$_4$. In some embodiments, the electrolyte may comprise an aqueous manganese plating bath.

In some embodiments, the volumetric energy density for the hybrid system may be about 29 Wh/L. In some embodiments, the cell voltage may be about 1 V.

Figure 1:
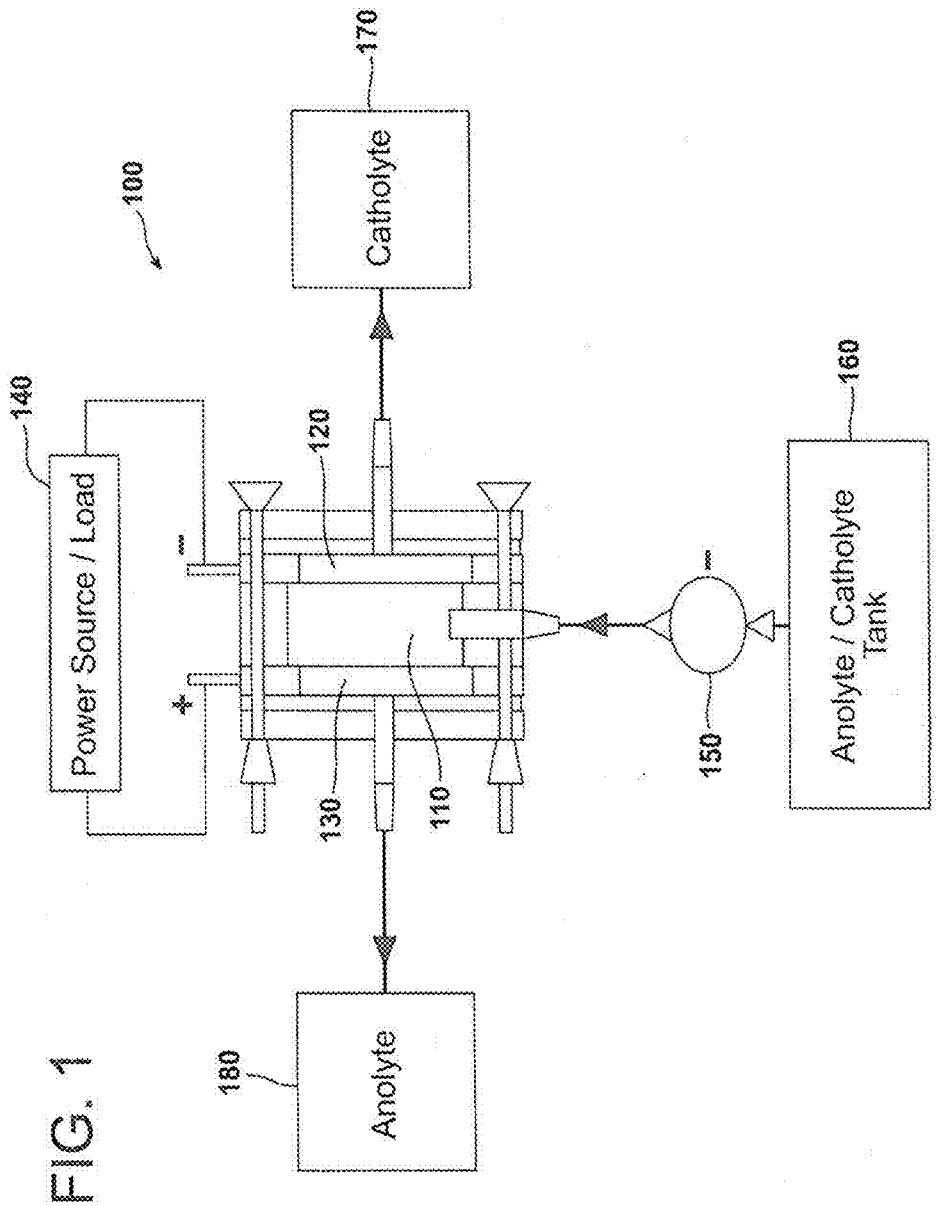
FIG. 1 shows a schematic of a single hybrid redox flow cell.

In another aspect, hybrid redox flow cells are provided. FIG. 1 illustrates an individual hybrid redox flow cell. Referring to FIG. 1, the hybrid redox flow cell 100 includes a flow cell chamber 110. The chamber 110 is in contact with both a negative electrode 120, and a positive electrode 130. The negative electrode 120 and the positive electrode 130 are connected to a device 140 that can function as a power source and/or a load. An electrolyte or anolyte/catholyte is pumped by a pump 150 from an electrolyte reservoir 160 through the first compartment 110. The catholyte passes through the porous negative electrode 120 and is collected in the reservoir 170. The anolyte passes through the porous positive electrode 130 and is collected in the reservoir 180.

In operation, the uncharged electrolyte is held in a common vessel or tank 160. It is then moved by the pump 150 through the two porous electrodes 120, 130. The valence of the reaction species on the positive electrode 130 is charged to the respective valence (Mn$^{2+}$→Mn$^{3+}$). The charged catholyte is then held in its respective vessel or tank 170. The negative electrode 120 operates on the reversible dissolution/plating of the Mn metal. The charged anolyte is held in its respective tank or vessel 180. The porous carbon used for the negative electrode 120 should be more open to accommodate the plating of the metal on its surface and not restrict or block the flow of electrolyte through the structure.

Figure 2:
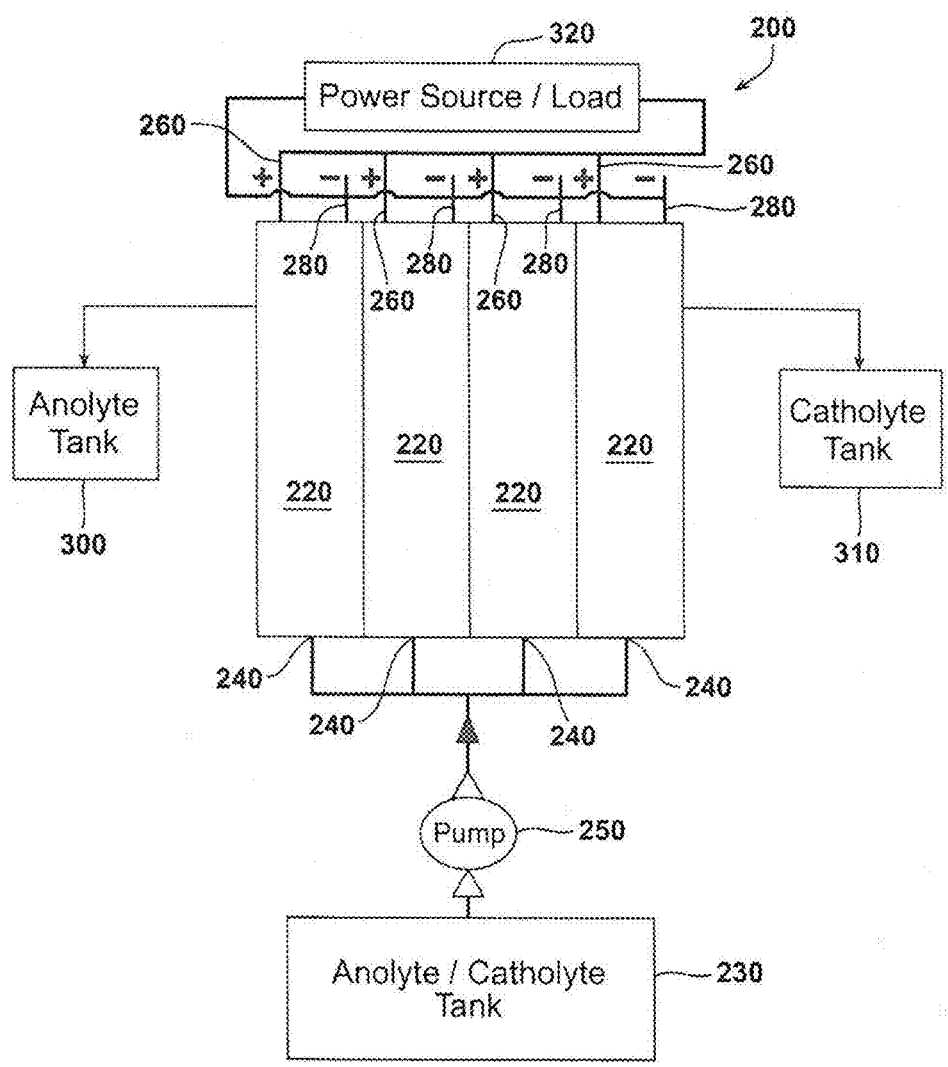
FIG. 2 shows a schematic of a stack including four individual hybrid redox flow cells.

FIG. 2 illustrates a hybrid redox flow battery 200 including four separate flow cells 220 of the type described above and generally illustrated in FIG. 1. The combined anolyte/catholyte is delivered from the tank 230 to the inlet 240 of each flow cell 220 by means of the pump 250. Each flow cell 220 includes a porous positive electrode 260 and a porous negative electrode 280. The anolyte passes through the porous positive electrodes and is collected in the anolyte tank 300. The catholyte passes through the porous negative electrodes and is collected in the catholyte tank 310. As illustrated, a device 320 that may function as a power source and/or load is connected to the electrodes 260,280.

Electrodes suitable for use as the positive end plate electrode and the negative end plate electrode in redox flow batteries of the present disclosure may be, for example, inert, conductive carbon electrodes. In some embodiments, the carbon electrodes may include carbon nanoparticles prepared from renewable biopolymers using hydrothermal synthesis ("HTS") methods, such as those described in PCT Patent Application No. PCT/US12/029247, which is hereby incorporated by reference in its entirety.

In some embodiments, the electrodes may include activated carbon nanospheres prepared using HTS. In some embodiments, activated carbon nanospheres may be derived from biopolymers such as, for example, bamboo and other lignocellulosics. In some embodiments, the electrodes may include graphitized carbon nanospheres, graphitized carbon nanotubes, and combinations thereof. In some embodiments, the carbon nanospheres and/or carbon nanotubes may be air brush sprayed or pressed onto a current collector. In some embodiments, the current collector may include, for example, stainless steel or nickel mesh.

In some embodiments, the electrodes may include graphite plate and particulate. In some embodiments, the electrode may include a binder such as, for example, polytetrafluoroethylene ("PTFE") or polyvinylidenedifluoride ("PVDF"). In some embodiments, the electrode may include about 3 wt % to about 5 wt % of a binder. In some embodiments, the electrode may also include an electrically-conductive additive such as, for example, graphite particulate. In some embodiments, the electrode may include about 5 wt % to about 10 wt % of the graphite particulate.

Various carbon felts may be used in redox flow batteries as electrode materials, and include, for example, graphitic, polyacrylonitrile, and rayon-based carbon felts. In some embodiments, the carbon electrode may be coated with a transition metal such as, for example Pt$^{4+}$, Pd$^{2+}$, Au$^{4+}$, Ir$^{3+}$, and Ru$^{4+}$. (See Wang, W. H. et al. *Electrochim. Acta.* 2007, 52, 6755; Sun, B. et al. *Electrochim. Acta.* 1991, 36, 513; and Rychcik, M. et al. *J. Power Sources.* 1987, 19, 45.) In some embodiments, the carbon electrodes may include carbon nanotube or graphite/carbon nanotube composite electrodes, which may lead to higher conductivity, better electrochemical reversibility, and enhanced electron transfer kinetics.

Flow cell chambers can be made from, for example, polyvinyl chloride ("PVC"), or DELRIN™ (polyoxymethylene), or other plastic materials that are inert to the electrolyte. In some embodiments, the flow cell chambers may have a volume of about 0.05 L to about 0.5 L. In some embodiments, the anolyte and the catholyte may flow through the flow cell chambers at rates of about 10 mLmin$^{-1}$ to about 80 mLmin$^{-1}$.

Hybrid redox flow batteries are particularly suited for utility grid energy storage, in the 100 kW to 10 MW size range. Various applications for redox flow batteries can include, for example, load-leveling, peak shaving, spinning reserve, and wind farm stabilization and dispatch. Flow batteries can be used for backup power; 5 kW units are currently available for backup power applications in telecom, substation, and UPS applications. Wind farms can serve as "power sources" for flow batteries, which store energy while the wind is blowing, and can release the stored energy to the electrical grid during peak times.

Pumps suitable for use in embodiments of the present invention can include pumps capable of maintaining anolyte and catholyte flow at a rate of about 10 mLmin$^{-1}$ to about 80 mLmin$^{-1}$. In some embodiments, the pump may be, for example a Cole-Parmer Masterflex L/S Economy Drive Pump (Cole-Parmer, Vernon Hills, Ill.).

A reservoir suitable for use in embodiments of the present invention can be inert to the anolyte and catholyte solutions they contain. In some embodiments, the reservoir can include, for example, polyethylene, coated fiberglass, or polyvinyl chloride ("PVC"). In some embodiments, the reservoir may have a volume of about 0.05 L to about 1 L.

Applications for Hybrid Redox Flow Batteries

Figure 4:
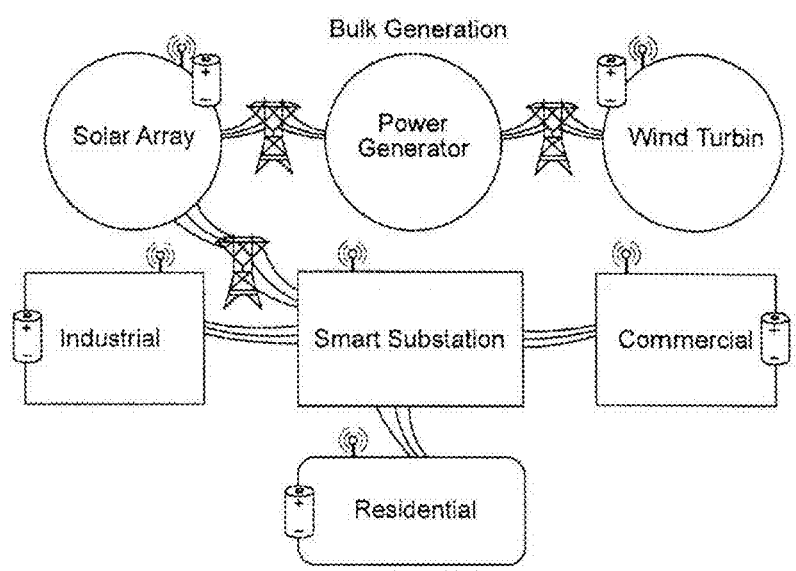
FIG. 4 shows a schematic representation of how flow batteries can be used in an EES system.

Because renewable energy sources such as solar and wind are intermittent, substantial penetration of such intermittent generation may place considerable stress on the U.S. electricity grid. Large-scale, efficient, electrical energy storage ("EES") systems can compensate for intermittent generation, and ensure that electricity is reliably available at all times. Embodiments of hybrid redox flow battery systems presented herein may fall into the category of EES systems and have uses in off-grid energy storage in, for example, load leveling, peak shaving, spinning reserve, uninterruptible power supply ("UPS"), wind farm stabilization, and dispatch. FIG. 4 shows a schematic diagram of how flow batteries can be used in an EES system. More specifically, electrical power generated by wind turbines, power generators and solar arrays is transmitted to a smart substation. When excess power is generated, it is stored in flow battery systems for industrial, commercial and residential use. In contrast, during other times when power is needed by users additional power is provided from the flow battery systems. Efficient building systems complete the EES system.

Embodiments of the presently-disclosed flow batteries can be used as backup power supplies for a variety of operations, including, for example, telecommunications, hospitals, and other large facilities that require uninterrupted power supplies. Some of these facilities are currently equipped with either solid oxide fuel cells ("SOFCs") or other forms of distributed energy, but also need EES systems to meet peak load demand, as well as loads that fall below the minimum practical turndown of the fuel cell. In addition, redox flow battery EES systems can act to maintain line voltage during step changes in load, thereby reducing any deleterious impact of load transients on SOFC system components, and on-board redox flow battery energy storage systems can allow for the controlled shutdown of powered systems and loads in the event of a SOFC system casualty.

EXAMPLES

The following Example is illustrative, but not limiting of the compositions and methods of the present disclosure. Other suitable modifications and adaptations of a variety of conditions and parameters normally encountered which are obvious to those skilled in the art are within the spirit and scope of this disclosure.

Example 1

Hybrid Redox Flow Battery System Based on an Mn/Mn Redox Couple at Both Electrodes The hybrid redox flow battery system is based on an aqueous manganese plating bath, which features manganese/manganese electrochemistry. The manganese anolyte is based on the $Mn^{2+}/Mn^{3+}$ redox couple, while the manganese catholyte is based upon the $Mn^{2+}/Mn^0$ redox couple. The electrolyte is a mixture of 1.18M $MnSO_4 \ast H_2O$ dissolved in 1.135M $(NH_4)_2SO_4/1M$ $H_2SO_4$. The hybrid flow battery system is a membraneless system, precluding the use of a proton exchange membrane (i.e. Nafion® as a separator, even though the cell will charge and discharge in the presence of a separator. The cell charge and discharge reactions for the anolyte are shown below in Eq. 1-4, and FIG. 3 is a schematic of the hybrid Mn/Mn flow battery system.

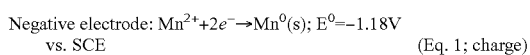
Negative electrode: $Mn^{2+}+2e^- \rightarrow Mn^0(s)$; $E^0=-1.18V$ vs. SCE (Eq. 1; charge)

Discharge: $Mn^0(s) \rightarrow Mn^{2+}+2e^-$ (Eq. 2; discharge)

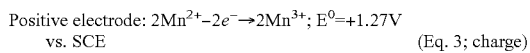
Positive electrode: $2Mn^{2+}-2e^- \rightarrow 2Mn^{3+}$; $E^0=+1.27V$ vs. SCE (Eq. 3; charge)

Discharge: $2Mn^{3+}+2e^- \rightarrow 2Mn^{2+}$ (Eq. 4; discharge)

Synthesis of manganese electrolyte (plating bath): 1.18M $MnSO_4 \ast H_2O$ in 1.135M $(NH_4)_2SO_4/1M$ $H_2SO_4$. The manganese plating bath may be prepared by the addition, with stirring at 25° C., of 28.5075 grams of $(NH_4)_2SO_4$ to 190 mL of 1M $H_2SO_4$, followed by the addition of 37.99 grams of $MnSO_4 \ast H_2O$ to the mixture. The solution concentration of the manganese salt is 1.183M, and the diammonium salt concentration is 1.135M. (See Wei, P. et al. *Surface and Coatings Technology.* 2007, 201, 7739.) In some embodiments, the catholyte may include about 1M to about 2M manganese ion. In some embodiments, the catholyte may have a pH of about 2 to about 6. In some embodiments, the catholyte may include a supporting electrolyte, such as, for example, $(NH_4)_2SO_4$ or ammonium bisulfate ("$NH_4HSO_4$"). In some embodiments, the catholyte may include about 1M to about 2M $(NH_4)_2SO_4$ in 1M $H_2SO_4$. In some embodiments, the electrolyte may comprise an aqueous manganese plating bath.

Figure 5:
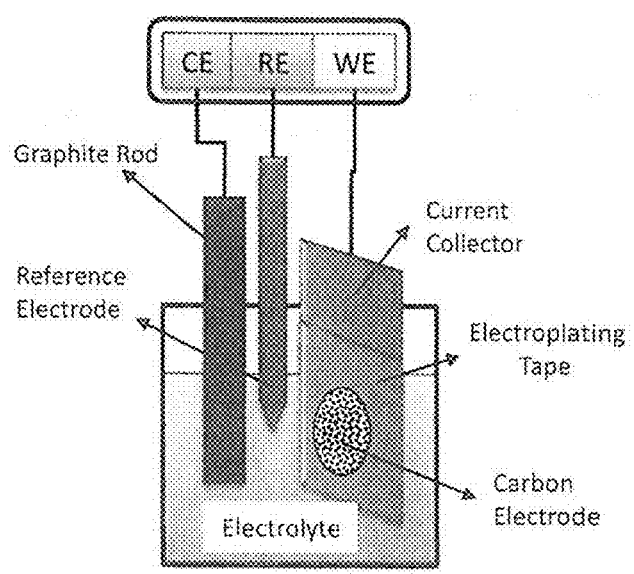
FIG. 5 is a schematic illustration of electrochemical half-cell testing.
Figure 6:
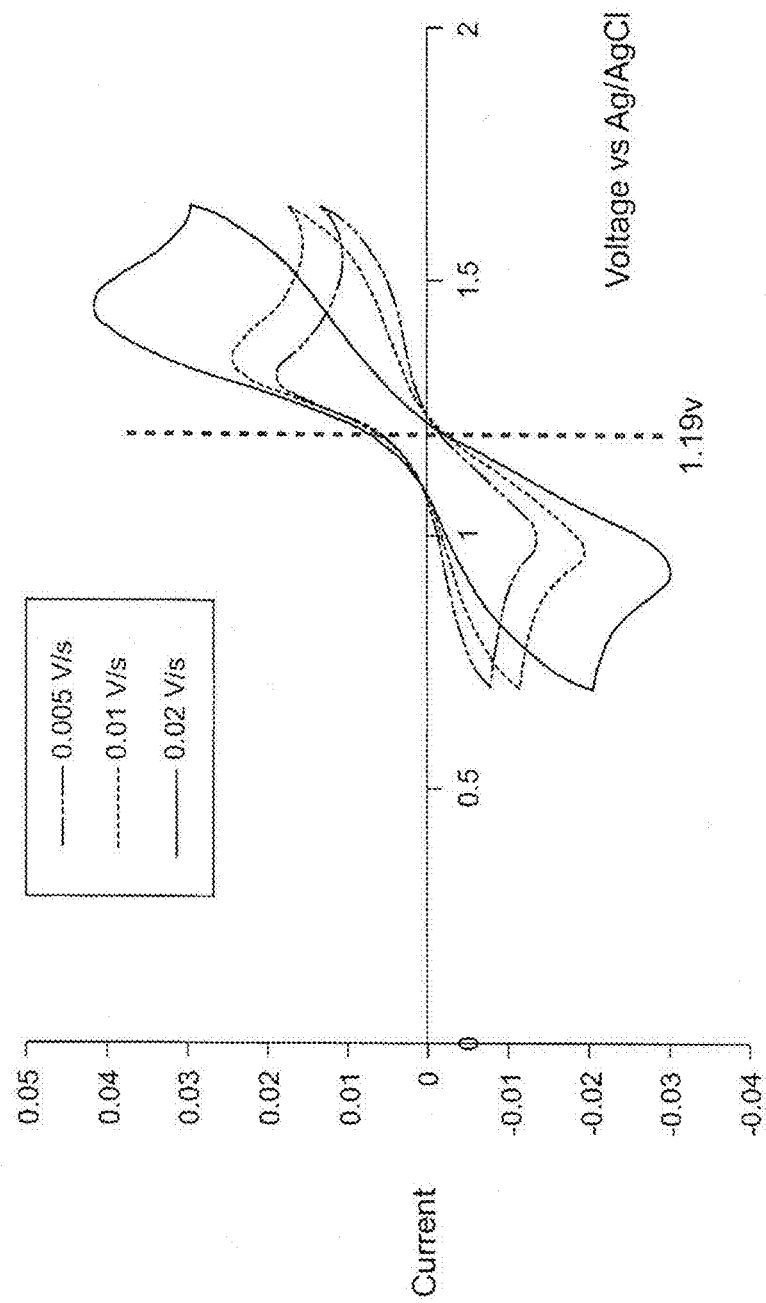
FIG. 6 illustrates cyclic voltammograms showing redox behavior of 1.183M $MnSO_4*H_2O$ dissolved in 1.135M $(NH_4)_2SO_4$/1M $H_2SO_4$. Working electrode (WE)=graphite disc, counter electrode (CE)=graphite rod and reference electrode (RE)=Ag/AgCl.

Cyclic voltammetry data. The electrolyte was tested for electrochemical activity in a three-electrode cell, using a graphite disk working electrode (diameter=2.54 cm), a graphite rod counter electrode, and a Ag/AgCl reference electrode (schematic shown in FIG. 5). Cycling was performed in an unstirred, quiescent solution (total electrolyte volume=150 mL). No nitrogen purge was used while testing occurred. The cyclic voltammogram for the electrolyte, at positive potentials, and various sweep rates, is shown in FIG. 6. The reversible potential for the Mn2+/Mn3+ redox couple is 1.19V vs Ag/AgCl, and shows a peak separation ($\Delta E_p$) of 0.510V.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An electrolyte system for a hybrid flow battery, comprising:
   an anolyte including $Mn^{2+}$ and $Mn^{3+}$;
   a catholyte including $Mn^{2+}$ and $Mn^0$; and
   a first supporting electrolyte to selected from the group consisting of $(NH_4)_2SO_4$, $NH_4HSO_4$ and mixtures thereof.

2. The electrolyte system of claim 1, further including a second supporting electrolyte.

3. The electrolyte system of claim 2, wherein said second supporting electrolyte is $H_2SO_4$.

4. The electrolyte system of claim 1, wherein said anolyte has a concentration of between about 1M and about 2M.

5. The electrolyte system of claim 4, wherein said electrolyte system has a pH of about 2 to about 6.

6. The electrolyte system of claim 1, wherein said electrolyte system further includes about 1M to about 2M $(NH_4)_2SO_4$ in about 1M $H_2SO_4$.

7. The electrolyte system of claim 1, wherein said electrolyte includes about 1.18M manganese salt.

8. The electrolyte system of claim 7, wherein said electrolyte includes about 1.13M diammonium salt.

9. The electrolyte system of claim 8, wherein said electrolyte includes about 1M $H_2SO_4$.

10. The electrolyte system of claim 1, wherein said electrolyte includes about 1.13M diammonium salt.

11. The electrolyte system of claim 1, wherein said electrolyte includes about 1M $H_2SO_4$.

12. A hybrid redox flow battery using comprising an anolyte including $Mn^{2+}$ and $Mn^{3+}$, a catholyte including $Mn^{2+}$ and $Mn^0$ and a first supporting electrolyte selected from the group consisting of $(NH_4)_2SO_4$, $NH_4HSO_4$ and mixtures thereof.

13. The flow battery of claim 12 wherein said battery includes a plurality of cells.

14. The flow battery of claim 12 wherein said battery does not include an ion-exchange membrane.

15. An electrolyte system for a hybrid flow battery, consisting of:
 an anolyte including $Mn^{2+}$ and $Mn^{3+}$;
 a catholyte including $Mn^{2+}$ and $Mn^0$; and
 a supporting electrolyte.

16. The electrolyte system of claim 15, wherein the supporting electrolyte is selected from the group consisting of $(NH_4)_2SO_4$, $NH_4HSO_4$ and mixtures thereof.

* * * * *